US006699385B2

(12) United States Patent
Miller

(10) Patent No.: US 6,699,385 B2
(45) Date of Patent: Mar. 2, 2004

(54) PROCESS FOR CONVERTING WAXY FEEDS INTO LOW HAZE HEAVY BASE OIL

(75) Inventor: Stephen J. Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 146 days.

(21) Appl. No.: 09/981,577

(22) Filed: Oct. 17, 2001

(65) Prior Publication Data

US 2003/0075477 A1 Apr. 24, 2003

(51) Int. Cl.[7] .......................... C10G 73/38; C10G 73/44
(52) U.S. Cl. ............................. 208/27; 208/92; 208/94; 208/950; 585/737
(58) Field of Search ..................... 208/27, 92, 94, 208/950; 585/737

(56) References Cited

U.S. PATENT DOCUMENTS

| | | | |
|---|---|---|---|
| 2,668,790 A | * 2/1954 | Good et al. ............ 208/20 |
| 2,668,866 A | * 2/1954 | Good et al. ............ 208/18 |
| 2,787,582 A | * 4/1957 | Watkins et al. ......... 208/58 |
| 3,242,068 A | 3/1966 | Pterson ............ 208/111.35 |
| 3,328,287 A | * 6/1967 | Smilski et al. ......... 208/87 |
| 3,487,005 A | * 12/1969 | Egan et al. ............. 208/59 |
| 3,700,585 A | 10/1972 | Chen et al. |
| 3,702,886 A | 11/1972 | Argauer et al. |
| 3,709,979 A | 1/1973 | Chu |
| 3,764,518 A | * 10/1973 | Henke et al. ........... 208/80 |
| 3,832,449 A | 8/1974 | Rosinsik et al. |
| 3,894,938 A | 7/1975 | Gorring et al. |
| 3,902,988 A | * 9/1975 | Bennett et al. ......... 208/80 |
| 3,950,496 A | 4/1976 | Ciric |
| 3,972,983 A | 8/1976 | Ciric |
| 4,016,245 A | 4/1977 | Plank et al. |
| 4,046,859 A | 9/1977 | Plank et al. |
| 4,076,842 A | 2/1978 | Plank et al. |
| 4,181,598 A | 1/1980 | Gillespie et al. |
| 4,222,855 A | 9/1980 | Pelrine et al. |
| 4,229,282 A | 10/1980 | Peters et al. |
| 4,247,388 A | 1/1981 | Banta et al. |
| 4,310,440 A | 1/1982 | Wilson et al. |
| 4,437,976 A | 3/1984 | Oleck et al. |
| 4,440,871 A | 4/1984 | Lok et al. |
| 4,500,651 A | 2/1985 | Lok et al. |
| 4,554,143 A | 11/1985 | Messina et al. |
| 4,567,029 A | 1/1986 | Wilson et al. |
| 4,575,416 A | 3/1986 | Chester et al. |
| 4,686,093 A | 8/1987 | Flanigen et al. |
| 4,832,819 A | * 5/1989 | Hamner ................. 208/27 |
| 4,859,311 A | 8/1989 | Miller |
| 4,861,743 A | 8/1989 | Flank et al. |
| 4,925,558 A | 5/1990 | Kappenberger |
| 4,943,672 A | * 7/1990 | Hamner et al. ........ 585/737 |
| 4,973,785 A | 11/1990 | Lok et al. |
| 5,037,528 A | * 8/1991 | Garwood et al. ........ 208/27 |
| 5,053,373 A | 10/1991 | Zones |
| 5,059,299 A | * 10/1991 | Cody et al. ............ 208/27 |
| 5,082,986 A | 1/1992 | Miller |
| 5,135,638 A | 8/1992 | Miller |
| 5,149,421 A | 9/1992 | Miller |
| 5,158,665 A | 10/1992 | Miller |
| 5,246,566 A | 9/1993 | Miller |
| 5,282,958 A | 2/1994 | Santilli et al. |
| 5,362,378 A | 11/1994 | Borghard et al. |
| 5,378,348 A | 1/1995 | Davis et al. |
| 5,514,362 A | 5/1996 | Miller |
| 5,689,031 A | 11/1997 | Berlowitz et al. |
| 5,723,716 A | 3/1998 | Brandes et al. |
| 5,741,751 A | 4/1998 | Miller |
| 5,833,837 A | 11/1998 | Miller |
| 6,008,164 A | 12/1999 | Aldrich et al. |
| 6,051,129 A | 4/2000 | Harris et al. |
| 6,080,301 A | * 6/2000 | Berlowitz et al. ....... 208/18 |
| 6,103,099 A | * 8/2000 | Wittenbrink et al. ... 208/27 |
| 6,190,532 B1 | * 2/2001 | Degnan et al. ......... 208/27 |
| 6,475,960 B1 | * 11/2002 | Berlowitz et al. ...... 508/110 |

FOREIGN PATENT DOCUMENTS

| | | | |
|---|---|---|---|
| EP | 0225053 A1 | 6/1987 | |
| EP | 0 321 305 A3 | 6/1989 | |
| EP | 0464546 A1 | 1/1992 | |
| EP | 0776959 A2 | 6/1997 | |
| GB | 1440230 A | * 6/1976 | ......... B01J/11/26 |
| WO | WO 9712012 A1 | * 4/1997 | ......... C10G/65/16 |
| WO | WO 01/11113 A1 | 2/2001 | |
| WO | 02/070629 A1 | 9/2002 | |

OTHER PUBLICATIONS

Anderson et al.,., *Journal of Catalysis*, 58, p. 114 (1979), Academic Press, Inc., New York and London, subsidiary of Harcourt Brace Jovanovich, Publishers.
Breck, Donald W., "Absorption by Dehydrated Zeolite Crystals", *Chapter 8, Zeolite Molecular Sieves*, (A Wiley–Interscience Publication, John Wiley & Sons, N.Y.) 8: 593–724, 1974.
International Search Report dated Jan. 13, 2003.
United Kingdom Search and Examiniation Report dated Mar. 28, 2003.
Netherlands Search Report dated Jun. 26, 2003.

* cited by examiner

*Primary Examiner*—Walter D. Griffin
(74) *Attorney, Agent, or Firm*—Burns, Doane, Swecker & Mathis, L.L.P.

(57) ABSTRACT

The present invention discloses a process for producing a low haze heavy base oil including the steps of: (a) providing a heavy waxy feed stream having an initial boiling point greater than 900° F. and having a paraffin content of at least 80%; (b) separating the heavy feed stream into a heavy fraction and a light fraction by a deep cut distillation; and (c) hydroisomerizing the light fraction to produce a low haze heavy base oil.

39 Claims, 1 Drawing Sheet

PROCESS FOR CONVERTING WAXY FEEDS INTO LOW HAZE HEAVY BASE OIL

FIELD OF THE INVENTION

The present invention relates to a process for producing low haze heavy base oil from a waxy feed.

BACKGROUND OF THE INVENTION

Various processes for dewaxing petroleum distillates are well known. The higher molecular weight straight chain normal, substituted and slightly branched paraffins present in lubricating oils are waxes that cause high pour points, high cloud points, and high haze points in the resulting lube oils. If adequate pour points, low haze, and low cloud points are to be obtained in lube oils, the waxes must be wholly or partially removed or converted. In the past, various solvent dewaxing techniques were employed; however, these techniques have high operating costs and significant environmental impacts. Today, catalytic dewaxing processes are used that are more economical and that remove the waxes by selectively isomerizing and/or cracking paraffinic components.

For example, European Patent Application No. 225,053 discloses a process for producing lubricant oils of low pour point and high viscosity index by partially dewaxing a lubricant base stock by isomerization dewaxing followed by a selective dewaxing step. The isomerization dewaxing step is carried out using a large pore, high silica zeolite dewaxing catalyst which isomerizes the waxy components of the base stock to less waxy branch chain isoparaffins. The selective dewaxing step may be either a solvent, e.g., MEK dewaxing operation or a catalytic dewaxing, preferably using a highly shape selective zeolite such as ZSM-22 or ZSM-23.

U.S. Pat. No. 6,051,129 discloses a dewaxing process for lowering the haze point of a bright stock which includes contacting a bright stock in the presence of added hydrogen gas with a Zeolite EU-1 catalyst in combination with a ZSM-48 and/or SSZ-32 catalyst.

Some lube oil streams, particularly heavy streams such as Bright Stock, contain naturally-occurring haze precursors that are more difficult to remove by conventional dewaxing than are the paraffinic waxes that predominate in lower boiling streams. If present in sufficient quantities, the haze precursors form a haze or cloud in the base oil at ambient (or lower) temperatures, particularly if the base oil is allowed to stand at the low temperature for some time (e.g., overnight). The base oil may develop a hazy appearance even after being dewaxed to a low pour point (e.g., less than $-5°$ C.). The haze will generally be the color of the base oil in which it forms and is usually white when present in otherwise colorless oil. While the haze generally has little or no effect on the performance of the base oil as a lubricating oil base stock, its presence suggests degraded visual quality and possible poor low temperature performance.

Bright Stock feed contains very heavy wax molecules that are difficult to isomerize and that form a haze in the isomerized product. Catalytic dewaxing of waxy Bright Stock (typically 1000° F.+) has been found to be very difficult due to the unacceptably high cloud point in the product (where the cloud is attributed to the residual wax). An acceptable cloud point is usually about 0° C. or less. In order to reduce the cloud point even near an acceptable level, increased conversion in the dewaxing (e.g., isodewaxing) reactor is required. This increased conversion not only reduces yield of the desired product but also reduces viscosity, thereby lowering the value of the lube.

There is a need in the art for an improved process for producing a low haze heavy base oil.

SUMMARY OF THE INVENTION

The present invention relates to processes for producing lubricating base oils with low haze. In one aspect of the present invention, a process for producing a low haze heavy base oil is provided comprising the steps of: (a) providing a heavy waxy feed stream having an initial boiling point greater than 900° F. and having a paraffin content of at least 80%; (b) separating the heavy feed stream into a heavy fraction and a light fraction by a deep cut distillation; and (c) hydroisomerizing the light fraction to produce a low haze heavy base oil.

In another aspect of the present invention, a process for producing a low haze heavy base oil is provided that uses a heavy Fischer-Tropsch waxy feed. The process comprises the steps of: (a) providing a heavy Fischer-Tropsch waxy feed; (b) separating the heavy Fischer-Tropsch waxy feed into a first light fraction and a first heavy fraction by atmospheric distillation; (c) separating the first heavy fraction into a second light fraction and a second heavy fraction by vacuum distillation (d) separating the second heavy fraction into a third light fraction and a third heavy fraction by a deep cut distillation; and (e) hydroisomerizing the third light fraction to produce a low haze heavy base oil. The second heavy fraction of step (c) has an initial boiling point greater than 900° F. and has a paraffin content of at least 80%.

In yet another aspect of the present invention, a process for producing a low haze heavy base oil is provided that also uses a heavy Fischer-Tropsch waxy feed. The process comprises the steps of: (a) providing a heavy Fischer-Tropsch waxy feed; (b) separating the heavy Fischer-Tropsch waxy feed into a first light fraction and a first heavy fraction by atmospheric distillation at a cut point in the range of 600°–750° F.; (c) separating the first heavy fraction into a second light fraction and a second heavy fraction by vacuum distillation at a cut point in the range of 950°–1100° F.; (d) separating the second heavy fraction into a third light fraction and a third heavy fraction by a deep cut distillation at a cut point in the range of 1200°–1300° F.; and (e) hydroisomerizing the third light fraction to produce a low haze heavy base oil. The second heavy fraction has a paraffin content of at least 80%, and the hydroisomerization of step (e) is carried out at a temperature from 200° C. to 475° C., at a pressure from 15 psig to 3000 psig, at a liquid hourly space velocity from 0.1 $hr^{-1}$ to 20 $hr^{-1}$, and in the presence of hydrogen at a hydrogen to feed ratio from 500 SCF/bbl to 30,000 SCF/bbl.

In still yet another aspect of the present invention, a process for producing a low haze heavy base oil and a high valued wax is provided comprising the steps of: (a) providing a heavy waxy feed stream having an initial boiling point greater than 900° F. and having a paraffin content of at least 80%; (b) separating the heavy feed stream into a heavy fraction and a light fraction by a deep cut distillation; and (c) hydroisomerizing the light fraction to produce a low haze heavy base oil. The heavy fraction separated in step (b) is a high valued wax.

In still yet another aspect of the present invention, a process for producing a low haze heavy base oil and a high valued wax is provided comprising the steps of: (a) providing a heavy waxy feed stream having an initial boiling point greater than 900° F. and having a paraffin content of at least 80%; (b) separating the heavy feed stream by a deep cut distillation and recovering a heavy fraction which is less than 30% w/w of the heavy feed stream and a light fraction which is greater than 70% w/w of the heavy feed stream; and (c) hydroisomerizing the light fraction to produce a low haze heavy base oil. The heavy fraction separated in step (b) is a high valued wax.

Definitions

Unless otherwise stated, the following terms used in the specification and claims have the means given below:

"Fischer-Tropsch wax" means the portion of a Fischer-Tropsch syncrude that contains at least 10% $C_{20}$ and higher hydrocarbonaceous compounds, preferably at least 40% $C_{20}$ and higher hydrocarbonaceous compounds and most preferably at least 70% $C_{20}$ and higher hydrocarbonaceous compounds. Fischer-Tropsch wax is most often a solid at room temperature.

"Distillate fuel" means a material containing hydrocarbons with boiling points between approximately 60° F. to 1100° F. The term "distillate" means that typical fuels of this type can be generated from vapor overhead streams from distilling petroleum crude. In contrast, residual fuels are generally not vaporizable and therefore cannot be generated from vapor overhead streams by distilling petroleum crude. Within the broad category of distillate fuels are specific fuels that include: naphtha, jet fuel, diesel fuel, kerosene, aviation gas, fuel oil, and blends thereof.

The presence of haze in materials of the present process may be determined using a cloud point measurement, such as ASTM-D5773. By "low haze" means a cloud point of 10° C. or less. Preferably, the cloud point of the low haze heavy base oil is 5° C. or less, more preferably 0° C. or less.

DETAILED DESCRIPTION OF ILLUSTRATIVE EMBODIMENTS

Figure 1:
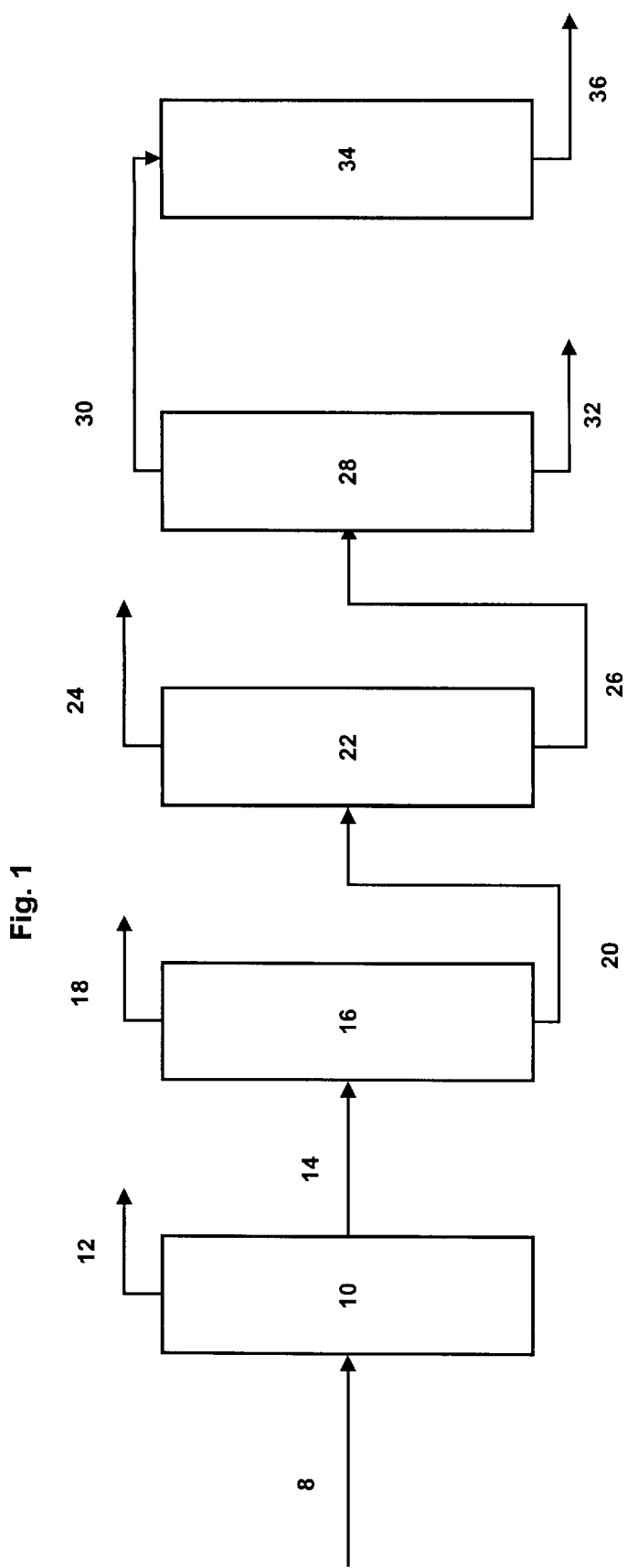
FIG. 1 illustrates a process for producing a low haze heavy base oil according to one embodiment of the present invention.

According to the present invention, a process is provided for producing a low haze heavy base oil that overcomes problems of the prior art. The process involves providing a heavy hydrocarbon wax feed stream, separating the heavy feed stream into a heavy fraction and a light fraction by deep cut distillation, and hydroisomerizing the light fraction to produce a low haze heavy base oil.

Lubricating base oils such as Ultra High Viscosity Index (UHVI) lube oils and Bright Stock are typically made by hydrocracking (and optionally hydrotreating) a heavy residuum feedstock for VI upgrade and heteroatom removal, followed by hydroisomerizing/dewaxing to remove waxy components. Fischer-Tropsch waxes, which are predominately paraffinic, are of value because they can be converted by isomerization to UHVI lube oils of greater than 120 VI, and often greater than 130 VI. Isomerization of the Fischer-Tropsch derived waxes lowers the pour point and cloud point of the waxes prior to use as a lubricating oil base stock.

It has been discovered that the difficulty in lowering the haze point of a base oil is directly related to the presence of a small amount of very high boiling paraffin and paraffin-like molecules (i.e. haze precursors) in the base oil. The haze precursors in Bright Stock leading to the most significant haze problem generally boil in the range above 1200°–1300° F. It is difficult to suitably reduce the haze in high wax feedstocks that have very high boiling points (e.g., greater than 1300° F.) and high wax content (e.g., greater than 80 weight %) by known prior art methods. This is especially true for Fischer-Tropsch derived feeds (i.e., any hydrocarbon feed stream derived from a Fischer-Tropsch process), because they can be as high as 100% wax. By removing the very high boiling material which contains the haze precursors (which, e.g., typically represents less than 30% of a 1000° F.+ wax), it has been discovered that the feed becomes much easier to process to a given cloud point.

The present invention overcomes the problem of haze and cloud point in lubricating base oil products by separating the heavy feed stream into a heavy fraction and a light fraction prior to hydroisomerization, thereby removing the haze precursors and other impurities associated with the heavy fraction (such as, for example, Fischer-Tropsch catalyst residue). Optionally, the light fraction may be hydrocracked prior to hydroisomerization. The light fraction is then used as a hydroisomerization feedstock for preparing a low haze heavy base oil. Because the heavy fraction (and therefore the haze precursors) are removed before hydroisomerization, the heavy base oil that is produced has a low haze and a low cloud point. The present invention also has a higher percentage yield of product (based on the feed stream) than prior art processes.

Feed Stream

The waxy feed stream which is hydroisomerized in the present invention has an initial boiling point greater than 850° F., preferably greater than 900° F., and more preferably greater than 950° F., and a boiling end point in the range of 1150°–1350° F., and preferably in the range of 1200°–1300° F. The waxy feed stream has a paraffin content of at least 80% by weight, and preferably greater than 90% by weight. An example waxy feed stream according to the present invention is derived from a Fischer-Tropsch process, has a 10% boiling point above 900° F., a mid boiling point in the range of 1025°–1075° F. and a boiling end point of 1200° F.

The feed stream may be any waxy feed that has the properties recited above, including a residuum from the distillation of a stream derived from a Fischer-Tropsch process and feed streams not originating from a Fischer-Tropsch process, such as, for example, petroleum-derived streams. Examples of methods for producing suitable Fischer-Tropsch derived feed streams include distillation of a $C_{5+}$ Fischer-Tropsch product stream, distillation of a 650° F.+ Fischer-Tropsch product stream, and distillation of a hydroprocessed (i.e., hydrotreated, hydrocracked, isomerized and/or hydroisomerized) stream derived from a Fischer-Tropsch process.

As more fully discussed below, FIG. 1 illustrates an embodiment of the present invention wherein the heavy waxy feed stream is provided by subjecting a Fischer-Tropsch wax or waxy stream to atmospheric and vacuum distillation. The selection of cutpoint temperatures may vary over a range of temperatures, depending on the specific operation. Distillations may be used to produce cutpoints from 600° F. to 750° F. for atmospheric distillation and from 900° F. to 1100° F. for vacuum distillation by process conditions known in the art. Conventional flash separation may also be performed on the various fractions in order to remove hydrogen and other gases.

Deep Cut Distillation

The heavy waxy feed stream is separated into a heavy fraction and a light fraction by a deep cut distillation. The deep cut distillation separates the heavy feed stream at a cut point greater than 1000° F., preferably greater than 1100° F., more perferably more than 1200° F. In the embodiment illustrated in FIG. 1 and further discussed below, a cut point in the range of 1150°–1350° F. (e.g. 1200° F.) is used in the deep cut distillation. The heavy fraction has a boiling point predominantly above the cut point and the light fraction has a boiling point predominantly below the cut point. The heavy fraction may be used as (or further processed to be used as) a wax. The light fraction is used as a feedstock for the hydroisomerization discussed more fully below.

Special care is required to separate very high boiling materials in order to minimize product degradation. WO 00/11113, which is incorporated herein by reference for all purposes, describes the use of special packing, stream stripping and high vacuum to achieve high temperature separations without product degradation. Other commercially available methods employ techniques developed as molecular distillation methods. These are described in detail in, for example, G. Burrows, *Molecular Distillation*, Oxford: Clarendon Press, 1960. Such short path distillation methods include falling film evaporators and wiped film evaporators. An example of short path distillation is described in U.S. Pat. No. 4,925,558, incorporated herein by reference in its entirety.

Hydrocracking/Hydrotreating

The fraction prepared by distillation prior to hydroisomerization may optionally be subjected to hydrocracking and/or hydrotreating before performing the hydroisomerization step discussed below in order to improve the light fraction as a feedstock for the hydroisomerization.

Hydrocracking is a process of breaking longer carbon chain molecules into smaller ones. It can be effected by contacting the particular fraction or combination of fractions, with hydrogen in the presence of a suitable hydrocracking catalyst. The hydrocracking step reduces the size of the hydrocarbon molecules, hydrogenates olefin bonds, hydrogenates aromatics, and removes traces of heteroatoms. Typical hydrocracking conditions include: reaction temperature, 400° F.–950° F. (204° C.–510° C.), preferably 650° F.–850° F. (343° C.–454° C.); reaction pressure 500 to 5000 psig (3.5–34.5 MPa), preferably 1500–3500 psig (10.4–24.2 MPa); liquid hourly space velocity (LHSV), 0.1 to 15 $hr^{-1}$ (v/v), preferably 0.25–2.5 $hr^{-1}$; and hydrogen consumption 500 to 2500 standard cubic feet per barrel of liquid hydrocarbon feed (89.1–445 $m^3$ $H_2/m^3$ feed). The hydrocracking catalyst generally comprises a cracking component, a hydrogenation component, and a binder. Such catalysts are well known in the art. The cracking component may include an amorphous silica/alumina phase and/or a zeolite, such as a Y-type or USY zeolite. The binder is generally silica or alumina. The hydrogenation component will be a Group VI, Group VII, or Group VIII metal or oxides or sulfides thereof, preferably one or more of molybdenum, tungsten, cobalt, or nickel, or the sulfides or oxides thereof. If present in the catalyst, these hydrogenation components generally make up from about 5% to about 40% by weight of the catalyst. Alternatively, platinum group metals, especially platinum and/or palladium, may be present as the hydrogenation component, either alone or in combination with the base metal hydrogenation components molybdenum, tungsten, cobalt, or nickel. If present, the platinum group metals will generally make up from about 0.1% to about 2% by weight of the catalyst.

Hydrotreating refers to a catalytic process, usually carried out in the presence of free hydrogen, in which the primary purpose is the desulfurization and/or denitrification of the feed stock. Generally, in hydrotreating operations cracking of the hydrocarbon molecules (i.e., breaking the larger hydrocarbon molecules into smaller hydrocarbon molecules) is minimized and the unsaturated hydrocarbons are either fully or partially hydrogenated. Hydrotreating conditions include a reaction temperature between 400° F.–900° F. (204° C.–482° C.), preferably 650° F.–850° F. (343° C.–454° C.); a pressure between 500 to 5000 psig (pounds per square inch gauge) (3.5–34.6 MPa), preferably 1000 to 3000 psig (7.0–20.8 MPa); a feed rate (LHSV) of 0.5 $hr^{-1}$ to 20 $hr^{-1}$ (v/v); and overall hydrogen consumption 300 to 2000 standard cubic feet per barrel of liquid hydrocarbon feed (53.4–356 $m^3$ $H_2/m^3$ feed). The hydrotreating catalyst for the beds will typically be a composite of a Group VI metal or compound thereof, and a Group VIII metal or compound thereof supported on a porous refractory base such as alumina. Examples of hydrotreating catalysts are alumina supported cobalt—molybdenum, nickel sulfide, nickel—tungsten, cobalt—tungsten and nickel—molybdenum. Typically, such hydrotreating catalysts are presulfided.

Hydroisomerization

After the deep cut distillation (or after the optional hydrocracking/hydrotreating step), the light fraction is subjected to hydroisomerization/isodewaxing to produce a low haze heavy base oil.

Hydroisomerization uses a dual-functional catalyst including an acidic component and a metal component. Typical metal components are platinum or palladium, although platinum is most commonly used. The preferred catalyst contains a molecular sieve and a metal component in an amount sufficient to achieve greater than 10% isomerized hexadecane products, and preferably greater than 40% isomerized hexadecane products, in the test described by Santilli et al. in U.S. Pat. No. 5,282,958. Specific molecular sieves which are useful in the hydroisomerization process of the present invention include the zeolites ZSM-5, ZSM-12, ZSM-21, ZSM-22, ZSM-23, ZSM-35, ZSM-38, ZSM-48, ZSM-57, SSZ-32, ferrierite and L and other molecular sieve materials based upon aluminum phosphates such as SM-3, SAPO-11, SAPO-31, SAPO-41, MAPO-11 and MAPO-31.

Non-zeolitic molecular sieves are generally taught, for example, in U.S. Pat. No. 4,861,743, the disclosure of which, is completely incorporated herein by reference for all purposes. Crystalline aluminophosphate molecular sieves (AlPO4) as described in U.S. Pat. No. 4,310,440. Metalloaluminophophate molecular sieves are described in U.S. Pat. Nos. 4,500,651; 4,567,029; 4,544,143; 4,686,093 and 4,861,743. Nonmetal substituted aluminophosphates are described in U.S. Pat. No. 4,973,785. The preferred non-zeolitic molecular sieve is an intermediate pore silicoaluminophosphate or SAPO. More preferred SAPO's include SAPO-11, SAPO-31, and SAPO-41. U.S. Pat. No. 4,440,871 describes SAPO's generally and SAPO-11, SAPO-31, and SAPO-41 specifically. A still more preferred intermediate pore isomerization silicoaluminophosphate molecular sieve prepared in the present process is SAPO-11. The most preferred intermediate pore SAPO prepared by the present process is SM-3, which has a crystalline structure falling within that of the SAPO-11 molecular sieves. A preparation of SM-3 and its unique characteristics are described in U.S. Pat. No. 5,158,665.

By "intermediate pore size", as used herein, is meant an effective pore aperture in the range of about 5.3 to about 6.5 Angstroms when the molecular sieve is in the calcined form. The effective pore size of the molecular sieves can be measured using standard adsorption techniques and hydrocarbonaceous compounds of known minimum kinetic diameters. See Breck, Zeolite Molecular Sieves, 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 5.3 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), hexamethylbenzene (7.1), and tributylamine (8.1). The preferred effective pore size range is from about 5.5 to about 6.2 Angstroms.

MAPO-5, MAPO-11, MAPO-14, MAPO-34 are described in U.S. Pat. No. 4,567,029. The descriptions of the molecular sieves, and of the preparations thereof, are also incorporated by reference.

Alternative catalysts known in the art for hydroisomerization of a waxy feed include a platinum/alumina catalyst comprising a sufficient amount of a halogen to give the catalyst activity for cracking a paraffinic feedstock. These catalysts are less preferred, however, because they have relatively low selectivity for the formation of a Bright Stock base oil product.

The catalytic hydroisomerization conditions employed depend on the feed used for the hydroisomerization and the desired pour point of the product. Generally, the temperature is from about 200° C. to about 475° C., preferably from about 250° C. to about 450° C. The pressure is typically from about 15 psig to about 3000 psig, preferably from about 50 psig to about 2500 psig, more preferably from about 100 psig to about 1000 psig, and most preferably from about 150 psig to about 600 psig. The liquid hourly space velocity (LHSV) is preferably from about 0.1 $hr^{-1}$ to about 20 $hr^{-1}$, more preferably from about 0.1 $hr^{-1}$ to about 5 $hr^{-1}$, and most preferably from about 0.1 $hr^{-1}$ to about 1.0 $hr^{-1}$. Low pressure and low liquid hourly space velocity provide enhanced isomerization selectivity, which results in more isomerization and less cracking of the feed, thus producing an increased yield.

Hydrogen is preferably present in the reaction zone during the catalytic isomerization process. The hydrogen to feed ratio is typically from about 500 to about 30,000 SCF/bbl (standard cubic feet per barrel), preferably from about 1,000 to about 20,000 SCF/bbl.

Products

The hydroisomerization produces a low haze heavy base oil. The low haze heavy base oil has a low haze and a low cloud point as defined herein. The low haze heavy base oil has an initial boiling point approximately the same as the feed stream for the hydroisomerization and has a pour point less than 5° C., preferably less than 0° C., more preferably –9° C. or less. Examples of low haze heavy base oils produced in accordance with the present invention include, for example, Bright Stock and heavy neutral base oil, as described below.

Bright Stock produced in accordance with the present invention has an initial boiling point of greater than 900° F. and a viscosity (measured at 100° C.) of greater than 15 cSt, preferably between 15 cSt and 30 cSt.

Heavy neutral base oil produced in accordance with the present invention boils in the range of 800° F.–1100° F., preferably in the range of 850° F.–1050° F. The heavy neutral base oil has a viscosity (measured at 100° C.) of preferably between 7 and 15 cSt.

Ultra High Viscosity Index (UHVI) lube oils are Bright Stock or heavy neutral base oil having a Viscosity Index of greater than 130, preferably greater than 140. Hydroisomerized Fischer-Tropsch waxes are a preferred source of UHVI lube oils.

EXAMPLES

The invention will be further explained by the following illustrative examples that are intended to be non-limiting.

Example 1

FIG. 1 illustrates one embodiment of the present invention wherein the heavy waxy feed stream is provided from a Fischer-Tropsch wax. As illustrated in FIG. 1, a CO and $H_2$ containing syngas 8 reacts in reaction zone 10 under conventional Fischer-Tropsch reaction process conditions (known to those skilled in the art) to produce a condensate 12 and a heavy Fischer-Tropsch waxy feed 14.

The heavy Fischer-Tropsch waxy feed is separated by conventional atmospheric distillation in a first distillation zone 16 at a cut point in the range of 600°–750° F. to produce a first light fraction 18 (i.e., a 700° F.– cut) and a first heavy fraction 20 (i.e., a 700° F.+ cut). The process conditions for such an atmospheric distillation are known to those skilled in the art.

The first heavy fraction is separated by conventional vacuum distillation in a second distillation zone 22 at a cut point in the range of 950°–1100° F. into a second light fraction 24 (i.e., a 700° F.–1000° F. cut) and a second heavy fraction 26 (i.e., a 1000° F.+ cut). The process conditions for such a vacuum distillation are known to those skilled in the art.

The second heavy fraction is used as the heavy waxy feed stream for a deep cut distillation. The second heavy fraction is separated by the deep cut distillation performed in a third distillation zone 28 at a cut point in the range of 1150°–1350° F. to produce a third light fraction 30 (i.e., a 1000° F.–1200° F. cut) and a third heavy fraction 32 (i.e., a 1200° F.+ cut). The process conditions for such a deep cut distillation are known to those skilled in the art.

The 1000° F.–1200° F. cut is then subjected to hydroisomerization 34 to produce a low haze Bright Stock 36 having a cloud point of +10° C. or less, preferably +5° C. or less, more preferably 0° C. or less, a pour point of –5° C. or less, a viscosity (measured at 100° C.) of greater than 15 cSt, preferably between 15 and 30 cSt, and a viscosity index of greater than 95, preferably greater than 115, and more preferably greater than 125. An exemplary hydroisomerization catalyst useful in the hydroisomerization process includes SAPO-11, which is described in U.S. Pat. No. 4,440,871. The catalyst made using the SAPO-11 is described, for example, in Example 1 of U.S. Pat. No. 4,859,311.

In an exemplary hydroisomerization process, the 1000° F.–1200° F. cut is contacted with the hydroisomerization catalyst in the presence of 5000 SCF/bbl hydrogen at a reaction temperature of 640° F., a feed rate (LHSV) of 1 $hr^{-1}$ and a total pressure of 2200 psig.

In an alternative exemplary hydroisomerization process, the 1000° F.–1200° F. cut is contacted with the hydroisomerization catalyst in the presence of 5000 SCF/bbl hydrogen at a reaction temperature of 640° F., a feed rate (LHSV) of 1 $hr^{-1}$ and a total pressure of 160 psig.

The various fractions not used to produce the low haze Bright Stock may be used as other products and/or further processed to produce other products. For example, the condensate 12 may be further processed to produce distillate, the 700° F.− cut (18) may be further processed to produce distillate, the 700–1000° F. cut (24) may be hydroisomerized to produce one or more lubricating oil base stocks, and the 1200° F.+ cut (32) may be recovered and processed into a high valued wax. Typical lubricating oil base stocks which may be produced in the present process include stocks having viscosities, measured at 100° C., in the range of 3–5 cSt, in the range of 5–7 cSt, 7–15 and/or 15–30 cSt. Typical viscosity indices for the lubricating oil base stocks are greater than 95. With Fischer-Tropsch derived feedstocks to the process, the viscosity index of at least one of the lubricating oil base stocks will generally be greater than 125, and may be as high as 160 or higher.

Example 2

In order to compare the prior art method to the present invention, a polyethylene wax was processed according to a prior art process and according to the present invention.

A low molecular weight polyethylene was obtained from a commercial supplier. This feed was cut at 1050° F. (75.4 wt % overhead) to yield a feedstock with the following simulated distillation:

| Wt % | °F. |
|---|---|
| St/5 | 683/695 |
| 10/30 | 696/772 |
| 50 | 840 |
| 70/90 | 927/1011 |
| 95/EP | 1044/1087 |

The overhead fraction was isomerized (Isodewaxed) over a Pt/SM-3 catalyst to yield a 5.6 cSt oil with a −18° C. pour point and a +4° C. cloud point. (Table I).

TABLE I

Yields Isodewaxing 1050° F.- Low Molecular Weight PE
over Pt/SM-3 Catalyst at 682° F., 0.5 LHSV, and 3.6 MSCF/bbl H2

| C$_4$-, Wt % | 1.5 |
|---|---|
| C$_5$-180° F. | 4.0 |
| 180–300° F. | 4.2 |
| 300–600° F. | 32.2 |
| 600–700° F. | 13.7 |
| 700° F.+ | 44.4 |
| 600–700° F. Cut | |
| Wt Percent of Feed | 14.6 |
| Pour Point, ° C. | −45 |
| Cloud Point, ° C. | −32 |
| Viscosity, 40° C., cSt | 5.505 |
| 100° C., cSt | 1.843 |
| 700° F.+ Bottoms | |
| Wt Percent of Feed | 45.6 |
| Wt Percent of Total PE | 34.4 |
| Pour Point, ° C. | −18 |
| Cloud Point, ° C. | +4 |
| Viscosity, 40° C., cSt | 26.44 |
| 100° C., cSt | 5.593 |
| VI | 158 |

While the invention has been described in detail and with reference to specific embodiments thereof, it will be apparent to one skilled in the art that various changes and modifications can be made without departing from the spirit and scope of the invention.

That which is claimed is:

1. A process for producing a low haze heavy base oil comprising the steps of:
    (a) providing a heavy waxy feed stream having an initial boiling point greater than 900° F. and having a paraffin content of at least 80%;
    (b) separating the heavy feed stream into a heavy fraction and a light fraction by a deep cut distillation; and
    (c) hydroisomerizing the light fraction to produce a low haze heavy base oil having an initial boiling point of greater than 800° F., a viscosity of at least 5 cSt at 100° C., a cloud point of less than 5° C., and a pour point of less than 5° C.

2. The process of claim 1 wherein the deep cut distillation separates the heavy feed stream at a cut point of greater than 1000° F.

3. The process of claim 1 wherein the deep cut distillation separates the heavy feed stream at a cut point in the range of 1150°–1350° F.

4. The process of claim 1 wherein the heavy waxy feed stream is derived from a Fischer-Tropsch reaction.

5. The process of claim 1 wherein the initial boiling point of the heavy waxy feed stream is at least 950° F.

6. The process of claim 1 wherein the low haze heavy base oil produced in step (c) has a cloud point of 0° C. or less.

7. The process of claim 1 wherein the low haze heavy base oil produced in step (c) is Bright Stock, heavy neutral base oil, or ultra high viscosity index lubricant oil.

8. The process of claim 1 wherein the low haze heavy base oil produced in step (c) has a viscosity of greater than 15 cSt at 100° C.

9. The process of claim 1 wherein the deep cut distillation is distillation in a wiped film evaporator.

10. The process of claim 1 wherein the low haze heavy base oil produced in step (c) has a viscosity of between 7 and 15 cSt at 100° C.

11. The process of claim 1 wherein the heavy fraction is wax.

12. The process of claim 1 further comprising the step of subjecting the light fraction to a process selected from the group consisting of hydrocracking and hydrotreating before step (c).

13. The process of claim 1 wherein the hydroisomerization is carried out at a temperature from 200° C. to 475° C., at a pressure from 15 psig to 3000 psig, at a liquid hourly space velocity from 0.1 hr$^{-1}$ to 20 hr$^{-1}$, and in the presence of hydrogen at a hydrogen to feed ratio from 500 SCF/bbl to 30,000 SCF/bbl.

14. A process for producing a low haze heavy base oil comprising the steps of:
    (a) providing a heavy Fischer-Tropsch waxy feed;
    (b) separating the heavy Fischer-Tropsch waxy feed into a first light fraction and a first heavy fraction by atmospheric distillation;
    (c) separating the first heavy fraction into a second light fraction and a second heavy fraction by vacuum distillation, the second heavy fraction having an initial boiling point greater than 900° F. and having a paraffin content of at least 80%;
    (d) separating the second heavy fraction into a third light fraction and a third heavy fraction by a deep cut distillation; and
    (e) hydroisomerizing the third light fraction to produce a low haze heavy base oil having an initial boiling point of greater than 800° F., a viscosity of at least 5 cSt at 100° C., a cloud point of less than 5° C., and a pour point of less than 5° C.

15. The process of claim 14 wherein the atmospheric distillation separates the heavy Fischer-Tropsch waxy feed at a cut point in the range of 600°–750° F., the vacuum distillation separates the first heavy fraction at a cut point in the range of 900°–1100° F., and the deep cut distillation separates the feed stream at a cut point in the range of 1150°–1350° F.

16. The process of claim 14 wherein the deep cut distillation separates the second heavy fraction at a cut point of at least 1200° F.

17. The process of claim 16 wherein the deep cut distillation separates the second heavy fraction at a cut point in the range of 1200–1300° F.

18. The process of claim 14 wherein the initial boiling point of the second heavy fraction is at least 950° F.

19. The process of claim 14 wherein the low haze heavy base oil produced in step (e) has a cloud point of 0° C. or less.

20. The process of claim 14 wherein the low haze heavy base oil produced in step (c) is Bright Stock, heavy neutral base oil, or ultra high viscosity index lubricant oil.

21. The process of claim 14 wherein the deep cut distillation is distillation in a wiped film evaporator.

22. The process of claim 14 wherein the low haze heavy base oil produced in step (e) has a viscosity from 15 cSt to 30 cSt at 100° C.

23. The process of claim 14 wherein the hydroisomerization is carried out at a temperature from 200° C. to 475° C., at a pressure from 15 psig to 3000 psig, at a liquid hourly space velocity from 0.1 $hr^{-1}$ to 20 $hr^{-1}$, and in the presence of hydrogen at a hydrogen to feed ratio from 500 SCF/bbl to 30,000 SCF/bbl.

24. The process of claim 14 wherein the third heavy fraction is wax.

25. The process of claim 14 wherein the low haze heavy base oil produced in step (c) has a viscosity of between 7 and 15 cSt at 100° C.

26. The process of claim 14 further comprising the step of subjecting the third light fraction to a process selected from the group consisting of hydrocracking and hydrotreating before step (e).

27. A process for producing a low haze heavy base oil comprising the steps of:
(a) providing a heavy Fischer-Tropsch waxy feed;
(b) separating the heavy Fischer-Tropsch waxy feed into a first light fraction and a first heavy fraction by atmospheric distillation at a cut point in the range of 600°–750° F.;
(c) separating the first heavy fraction into a second light fraction and a second heavy fraction by vacuum distillation at a cut point in the range of 900°–1100° F., the second heavy fraction having a paraffin content of at least 80%;
(d) separating the second heavy fraction into a third light fraction and a third heavy fraction by a deep cut distillation at a cut point in the range of 1200–1300° F.; and (e) hydroisomerizing the third light fraction to produce a low haze heavy base oil at a temperature from 200° C. to 475° C., at a pressure from 15 psig to 3000 psig, at a liquid hourly space velocity from 0.1 $hr^{-1}$ to 20 $hr^{-1}$, and in the presence of hydrogen at a hydrogen to feed ratio from 500 SCF/bbl to 30,000 SCF/bbl, wherein the low haze heavy base oil has an initial boiling point of greater than 800° F., a viscosity of at least 5 cSt at 100° C., a cloud point of less than 5° C., and a pour point of less than 5° C.

28. The process of claim 27 wherein the low haze heavy base oil has a viscosity of 15 to 30 cSt at 100° C.

29. The process of claim 27 wherein the low haze heavy base oil produced in step (e) has a cloud point of 0° C. or less.

30. The process of claim 27 wherein the low haze heavy base oil produced in step (e) is Bright Stock, heavy neutral base oil, or ultra high viscosity index lubricant oil.

31. The process of claim 27 wherein the deep cut distillation is distillation in a wiped film evaporator.

32. The process of claim 27 wherein the low haze heavy base oil produced in step (e) has a viscosity from 15 cSt to 30 cSt at 100° C.

33. The process of claim 27 wherein the third heavy fraction is wax.

34. The process of claim 27 further comprising the step of subjecting the third light fraction to a process selected from the group consisting of hydrocracking and hydrotreating before step (e).

35. A process for producing a low haze heavy base oil and wax comprising the steps of:
(a) providing a heavy waxy feed stream having an initial boiling point greater than 1000° F. and having a paraffin content of at least 80%;
(b) separating the heavy feed stream into a heavy fraction and a light fraction by a deep cut distillation, the heavy fraction being wax; and
(c) hydroisomerizing the light fraction to produce a low haze heavy base oil having an initial boiling point of greater than 800° F., a viscosity of at least 5 cSt at 100° C., a cloud point of less than 5° C., and a pour point of less than 5° C.

36. The process of claim 35 wherein the deep cut distillation separates the heavy feed stream at a cut point of at least 1200° F.

37. The process of claim 35 wherein the low haze heavy base oil produced in step (c) has a cloud point of 0° C. or less.

38. The process of claim 35, wherein the deep cut distillation separates the heavy feed stream at a cut point of 1150–1350° F.

39. The process of claim 35, wherein the low haze heavy base oil has a viscosity of 7 to 15 cSt at 100° C.

* * * * *

UNITED STATES PATENT AND TRADEMARK OFFICE
CERTIFICATE OF CORRECTION

PATENT NO. : 6,699,385 B2
DATED : March 2, 2004
INVENTOR(S) : Stephen J. Miller

It is certified that error appears in the above-identified patent and that said Letters Patent is hereby corrected as shown below:

Column 10,
Line 48, please delete "0.1 $hr^1$" and insert -- 0.1 $hr^{-1}$ -- in place thereof.

Signed and Sealed this

Third Day of August, 2004

JON W. DUDAS
*Acting Director of the United States Patent and Trademark Office*